United States Patent
Wahl et al.

(10) Patent No.: US 9,956,933 B2
(45) Date of Patent: May 1, 2018

(54) SAFETY SYSTEM FOR A MOTOR BIKE AND METHOD FOR TRIGGERING A SAFETY SYSTEM

(71) Applicant: Robert Bosch GmbH, Stuttgart (DE)

(72) Inventors: Anja Wahl, Markgroeningen (DE); Torsten Maka, Stuttgart (DE); Marielle Cuvillier, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 14/915,780

(22) PCT Filed: Sep. 2, 2014

(86) PCT No.: PCT/EP2014/068581
§ 371 (c)(1),
(2) Date: Mar. 1, 2016

(87) PCT Pub. No.: WO2015/032736
PCT Pub. Date: Mar. 12, 2015

(65) Prior Publication Data
US 2016/0207486 A1 Jul. 21, 2016

(30) Foreign Application Priority Data
Sep. 6, 2013 (DE) .......................... 10 2013 217 851

(51) Int. Cl.
*A41D 13/018* (2006.01)
*B60R 21/16* (2006.01)
(Continued)

(52) U.S. Cl.
CPC ........ *B60R 21/0136* (2013.01); *A41D 13/018* (2013.01); *A42B 3/122* (2013.01);
(Continued)

(58) Field of Classification Search
None
See application file for complete search history.

(56) References Cited

U.S. PATENT DOCUMENTS

2003/0074137 A1* 4/2003 Ota .................... B60R 21/0132
701/301
2008/0238056 A1* 10/2008 Kobayashi .......... A41D 13/018
280/735
(Continued)

FOREIGN PATENT DOCUMENTS

JP        S49119745 A    11/1974
JP        2003276668 A   10/2003

OTHER PUBLICATIONS

International Search Report for PCT/EP2014/068581, dated Dec. 8, 2014.

*Primary Examiner* — Kevin P Mahne
(74) *Attorney, Agent, or Firm* — Norton Rose Fulbright US LLP; Gerard Messina

(57) ABSTRACT

A safety system for a motor bike includes an evaluation and control unit which receives crash-relevant information from at least one sensor unit and evaluates it for the purpose of detecting a crash, and in response to a detected crash, the evaluation and control unit activates at least one external safety component and/or at least one internal safety component using a triggering concept. The evaluation and control unit receives presence signals from the at least one external safety component and/or the at least one internal safety component and evaluates the received signals in order to detect the safety components currently available. The evaluation and control unit selects the triggering concept as a function of the detected safety components currently available.

11 Claims, 2 Drawing Sheets

(51) Int. Cl.
*B62J 27/00* (2006.01)
*B60R 21/0136* (2006.01)
*B60R 22/00* (2006.01)
*A42B 3/12* (2006.01)
*B60R 21/013* (2006.01)
*B60R 21/01* (2006.01)
*B60R 21/00* (2006.01)

(52) U.S. Cl.
CPC ............ *B60R 21/013* (2013.01); *B60R 21/16* (2013.01); *B60R 22/00* (2013.01); *B62J 27/00* (2013.01); *A41D 2600/102* (2013.01); *B60R 2021/003* (2013.01); *B60R 2021/0088* (2013.01); *B60R 2021/01088* (2013.01); *B62K 2207/00* (2013.01)

(56) References Cited

U.S. PATENT DOCUMENTS

| | | | |
|---|---|---|---|
| 2011/0237194 A1* | 9/2011 | Kojima | A41D 13/018 455/41.3 |
| 2014/0070931 A1* | 3/2014 | Savaresi | B60R 21/0132 340/436 |

* cited by examiner

SAFETY SYSTEM FOR A MOTOR BIKE AND METHOD FOR TRIGGERING A SAFETY SYSTEM

BACKGROUND OF THE INVENTION

1. Field of the Invention

The present invention relates to a safety system for a motor bike, as well as a corresponding method for triggering a safety system.

2. Description of the Related Art

In comparison to an automobile, one is exposed to considerably higher risk in road traffic as a motor-bike rider like, for example, a motorcycle rider and/or a motor-trike rider and/or a quad rider and/or a scooter rider and/or a moped rider. Among other things, this is because of the different driving physics and the constantly unstable state of balance, as well as the particular physical and psychological stress when riding a motor bike and the limited field of view. At the same time, motor-bike riders are considerably more sensitive to weather factors and other disturbance factors like, for instance, poor road conditions or unexpected traffic conditions. In addition, there is no protective body shell in the case of a motor bike. In spite of protective clothing, motor-bike riders are unprotected road users during collisions or crashes due to the lack of passive safety.

Safety systems for a motor bike, which protect the motor-bike rider in the event of a collision, are known from the related art and have a first evaluation and control unit that receives crash-relevant information from at least one sensor unit via at least one interface and evaluates it for the purpose of detecting a crash. In response to a detected crash, the first evaluation and control unit activates at least one external safety component and/or at least one internal safety component using a triggering concept. The activated safety components usually take the form of passive safety components. Airbag systems are known as passive internal safety components, which have an inflatable airbag in the area of a fuel tank. Independently of that, in the case of motor bikes, active internal safety components in the form of antilock braking systems are known, by which it is possible to attain a marked decline of accidents with injury to persons. If a collision nevertheless occurs, further accident-alleviating safety components should take effect, such as a safety-belt system for motor-bike riders, having a belt strap and a belt buckle. An internal safety component implemented as an inflatable side-impact protection is familiar, as well. In the inoperative state, the side-impact protection is folded in space-saving fashion as a metal profile into a side structure of a motor vehicle. A customary compressed-gas inflator is able to fill this structure with an internal pressure of 10 to 20 bar. The metal profile unfolds, and thereby obtains more stability. In addition, external passive safety components may be integrated into the clothing of the rider. What are termed airbag jackets, which are implemented as motor-bike jackets with integrated airbags, are familiar and are already available commercially to some extent. These airbag jackets may be triggered either via an integrated evaluation and control unit and/or by ripcord and/or via radio by an evaluation and control unit integrated in the motor bike. It is assumed that in the future, passive safety systems will achieve greater importance and market penetration in the motor-bike sector, as well. In contrast to an automobile, however, the integration of passive safety systems solely into the motor bike is possible only to a limited extent. In the case of motor bikes, integration of external safety components into the personal protective equipment of the rider, like into the helmet and/or the clothing, for example, is advantageous in order to achieve a high level of safety.

The published German patent application document DE 103 17 439 A1 describes a motorcycle with a restraining device for motorcyclists, having a fastening element via which the motorcyclist is detachably bound to the motorcycle. In response to a detected rear-end collision, during a first phase of the rear-end collision, the motorcyclist is initially retained on the motorcycle by the fastening element. In this context, the restraining force of the fastening element counteracts the inertial force of the motorcyclist. The fastening element is disposed in such a way that in the first phase, due to inertia, the motorcyclist is shifted contrary to the restraining force of the fastening element relative to the motorcycle, whereby kinetic energy of the motorcyclist is reduced. The fastening element is subsequently released without assistance by the motorcyclist.

The U.S. Patent Application Publication U.S. 2011/0237194 A1 describes an airbag jacket for a rider of a motor bike. The airbag jacket described has a receiver for receiving a wirelessly transmitted signal, and an airbag. In response to a detected accident, the wirelessly transmitted signal is sent out by an internal evaluation and control unit of the motor bike and activates the airbag of the airbag jacket.

BRIEF SUMMARY OF THE INVENTION

The safety system according to the present invention for a motor bike and the method according to the present invention for triggering a safety system for a motor bike advantageously evaluate presence signals of at least one external safety component and/or at least one internal safety component in order to detect the safety components currently available. A triggering concept is then selected as a function of the detected safety components currently available. That means that all existing passive safety components may advantageously be included in the selection of the triggering concept, so that the safety components actually available may be optimally coordinated with one another. Advantageously, both the internal safety components and the external safety components are not, like in known methods heretofore, considered largely separately and optimized independently, but rather, the internal safety components and the external safety components are included in one common triggering concept. In this manner, a modular and/or adaptive safety system of the passive safety may advantageously be created for motorized two-wheelers and/or motor trikes and/or quads, which includes both internal safety components that are integrated into the motor bike, such as sensors and/or airbag systems, as well as external safety components that are integrated into the clothing of the rider, for example, or are able to be detachably joined to the motor bike. Depending on the availability of the individual safety components, the triggering concept may be adapted in advantageous manner to the instantaneous conditions, and the protective effect for the rider may be optimized. Thus, for example, it is possible to prevent the situation where the rider is additionally injured by at least one safety component at the moment of activation, or where two safety components impede one another.

Specific embodiments of the present invention provide a safety system for a motor bike, having a first evaluation and control unit that receives information from at least one sensor unit and evaluates it for the purpose of detecting a crash. In response to a detected crash, the first evaluation and control unit activates at least one external safety component and/or at least one internal safety component using a triggering concept. According to the present invention, the evaluation and control unit receives presence signals from the at least one external safety component and/or the at least one internal safety component, and evaluates the signals received in order to detect the safety components currently available. The first evaluation and control unit selects the triggering concept as a function of the detected safety components currently available.

In addition, specific embodiments of the present invention provide a method for triggering a safety system for a motor bike, which evaluates crash-relevant information from at least one sensor unit for the purpose of detecting a crash, at least one external safety component and/or at least one internal safety component being activated using a triggering concept in response to a detected crash. In the present invention, presence signals from the at least one external safety component and/or the at least one internal safety component are evaluated in order to detect the safety components currently available, the triggering concept being selected as a function of the detected safety components currently available.

Advantageously, the available safety components of the passive safety may be searched for automatically during a system start and incorporated into the safety system for the running period.

The functionality of the first evaluation and control unit for receiving and evaluating the evaluation signals and for selecting the corresponding triggering concept may be integrated, for example, into an evaluation and control unit of an internal passive or active safety component already present in the motor bike, such as into a control device of an airbag system or a control device of an antilock braking system (ABS). The crash-relevant information may be acquired and evaluated and the presence signals of the internal safety components and/or the external safety components may be generated and output in further evaluation and control units that are situated in the area of the passive safety components. In this case, all further evaluation and control units are subordinate to the first evaluation and control unit, so that the first evaluation and control unit acts as "master unit" and the further evaluation and control units act as subordinate "slave units." The triggering concept is selected and the safety components are activated only by the first evaluation and control unit. Communication between the individual components may take place via a BUS system, such as via a CAN bus. Direct links for the exchange of information between the individual components are conceivable, as well. Advantageously, a multitude of information about the motor bike and/or the rider and/or the instantaneous driving situation is available to the evaluation and control units. This information may be sensed and output by external and/or internal sensor units. In addition, data and information from other motor-bike systems such as an engine control and/or the antilock braking system (ABS) and/or a manual input and output system, via which the rider is able to input personal data such as age and/or weight, etc., may be acquired and evaluated. The scope of the total information available is advantageously greater than the information available in the individual safety components. Therefore, the driving condition is able to be assessed better and more reliably and the interaction of the safety components is able to be coordinated in the first evaluation and control unit, so that the overall strategy for the passive safety may be designed for the optimal protection of the rider. Moreover, data from existing sensor units may be used advantageously by several safety components, thereby making it possible to attain a synergistic effect. By skillful placement of sensors and the availability of extensive information from various sensors for the assessment of the driving situation, a better overall performance of the safety system may advantageously be attained in comparison to a design approach with dispersed evaluation and control units for the respective passive safety systems, each of which possesses only a portion of the information.

The at least one sensor unit includes pressure-sensitive sensors, for example, that ascertain an impact area on the motor bike and/or sensors which ascertain objects and/or obstacles and/or other crash-relevant vehicle-environment data and make it available for evaluation. For instance, such sensors may be based on video and/or radar and/or lidar and/or PMD and/or ultrasound technologies. The use of an ABS sensor system is also possible.

It is especially advantageous that the first evaluation and control unit is able to select the triggering concept as a function of the mode of operation of the safety components currently available. As a result, the safety components currently available may be used in such a way that they advantageously complement one another and/or at least do not hinder one another.

In advantageous refinement of the safety system according to the present invention, the evaluation and control unit may select the triggering concept as a function of the crash situation detected. Because the crash situation detected is included when selecting the triggering concept, the most comprehensive protection possible is advantageously enabled for the rider under various boundary conditions. Based on the data of external and/or internal sensor units, the selection of the triggering concept may advantageously be optimized and the protective action of the safety components may be coordinated with one another. Furthermore, it is possible to activate only the safety components currently available which are needed in the crash situation detected. For example, in the case of a frontal crash, the triggering characteristic of a front airbag may be optimized for the interaction with a safety belt.

In further advantageous development of the safety system according to the present invention, the triggering concept may specify an activation sequence and/or an activation instant for the safety components currently available. Advantageously, a modular overall system of the passive vehicle safety may be created, into which safety components of the passive safety may be flexibly integrated. For instance, an airbag of an airbag jacket and/or an airbag of an airbag helmet may be activated at the optimal instant by the evaluation and control unit. In addition, the components currently available may be triggered in a manner adapted to the situation, in order to ensure the best possible protection for the rider.

In further advantageous refinement of the safety system according to the present invention, the triggering concept may be stored as at least one characteristic curve in a memory unit. This at least one characteristic curve may be a function of the existing combination of safety components available and/or the triggering strategy resulting from that. The interaction of the existing safety components may advantageously be coordinated and optimized by the evaluation and control unit with the aid of the at least one characteristic curve.

In further advantageous development of the safety system according to the present invention, the at least one external safety component may be implemented as a safety component detachably mounted on the motor bike and/or as a first external safety component integrated into the clothing of the rider and/or as a second external safety component integrated into the helmet of the rider. This has the advantage that especially the safety components of the passive safety which are not permanently installed in the vehicle, but rather are integrated into the clothing of the rider and/or which are joined detachably to the motor bike may be incorporated flexibly into the safety concept and thus contribute to the improvement in rider safety. For instance, the external safety component may take the form of an airbag jacket and/or an airbag helmet having an integrated neck airbag. Moreover, the rider himself may advantageously expand and/or configure the safety system, and in this way advantageously decide himself about the extent of protection. Thus, for example, an additional airbag system may be detachably secured on the tank and be coupled to the first evaluation and control unit via a corresponding interface.

In further advantageous refinement of the safety system according to the present invention, the at least one internal safety component may be implemented as a safety-belt system and/or as an airbag system integrated into the motor bike. By the selection of the triggering concept, the airbag system, in combination with a safety-belt system, may advantageously deploy later or more gently in order to reduce the strain for the rider.

In further advantageous development of the safety system according to the present invention, the first evaluation and control unit may have at least one interface for the wireless and/or wire-bound communication with the safety components currently available. Consequently, many different transmission technologies such as Bluetooth and/or radio and/or infrared, etc., may advantageously be employed. The individual safety components and/or sensor units are able to exchange status information and important parameters with the first evaluation and control unit. Since the data may advantageously be acquired during running time, the first evaluation and control unit is able to react flexibly to the failure of safety components, such as an empty battery in the airbag jacket, for instance. Preferably, the at least one interface is standardized. Owing to such a standardized interface, safety components are able to be combined in advantageous manner regardless of the manufacturer, so that safety components offered by different manufacturers may easily be incorporated via the standardized interface into the safety system of the present invention.

An exemplary embodiment of the present invention is shown in the drawing and elucidated in the following description. In the drawing, the same reference numerals denote components or elements which carry out the same or analogous functions.

DETAILED DESCRIPTION OF THE INVENTION

The essence of the present invention is to provide a safety system for two-wheeled and/or three-wheeled vehicles which, in the event of an imminent collision or in response to a collision and/or in the case of an unfavorable driving condition, supplies the most advantageous possible combination of the safety components currently available and offers the best possible protection for the rider under the instantaneous boundary conditions.

Figure 1:
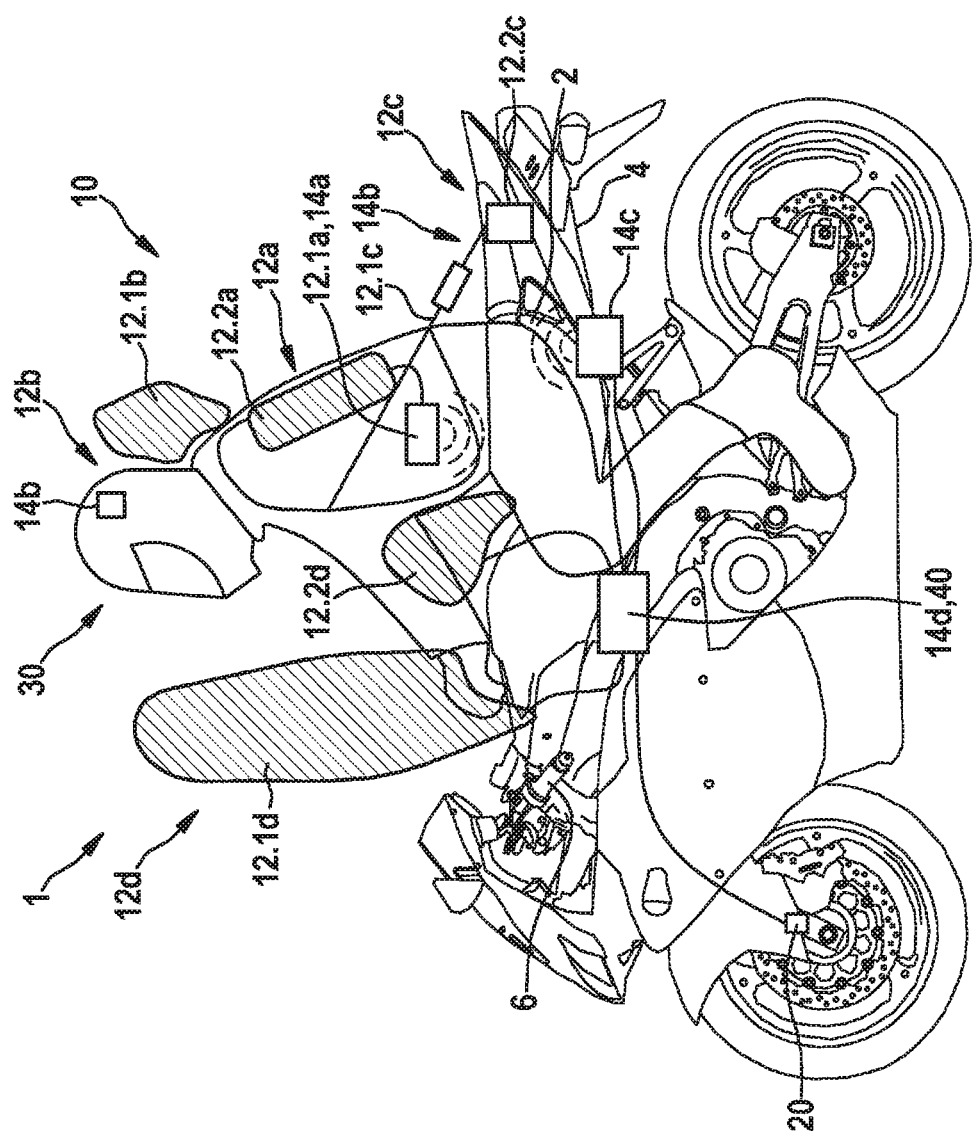
FIG. 1 shows a schematic side view of a motor bike having a safety system according to the present invention.

As evident from FIG. 1, a motor bike 1 includes a frame 4, a handlebar 6, at least one sensor unit 20, a fuel tank, a seat 2 and a safety system 10.

Figure 2:
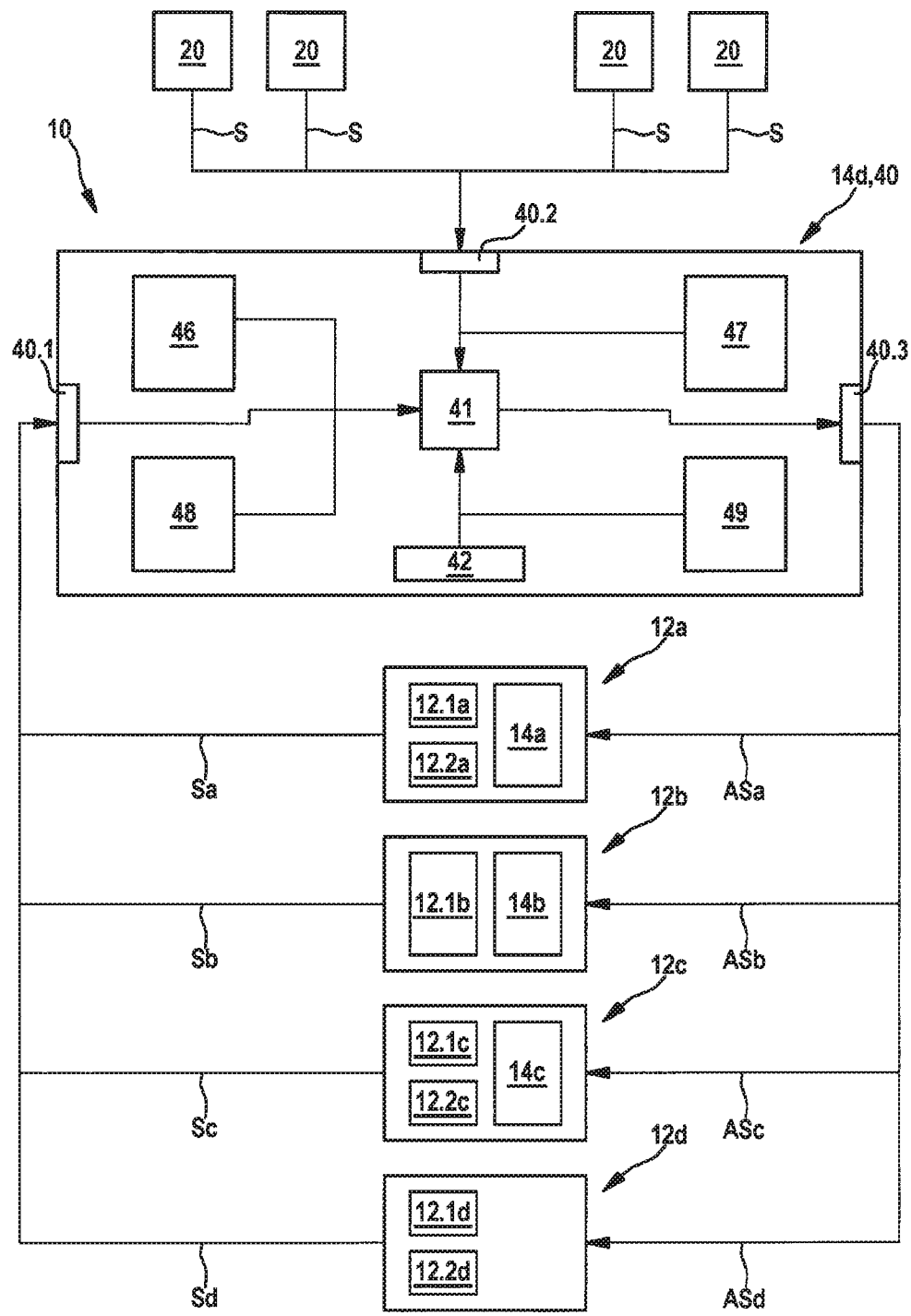
FIG. 2 shows a schematic block diagram of the safety system for a motor bike according to the present invention.

As also evident from FIGS. 1 and 2, safety system 10 has a first evaluation and control unit 40, which in the exemplary embodiment shown, has three interfaces 40.1, 40.2, 40.3, an arithmetic logic unit 41 and a memory unit 42. Arithmetic logic unit 41 executes various function blocks 46, 47, 48, 49, of which, by way of example, a first function block 46 represents a crash algorithm 46, a second function block 47 represents a communication module, a third function block 48 represents a configuration management 48 and a fourth function block 49 represents further functionalities such as hardware device driver, crash recorder, ABS, etc. First evaluation and control unit 40 receives crash-relevant information as sensor signals S from at least one sensor unit 20 via a first interface 40.1. Arithmetic logic unit 41 evaluates these sensor signals S, and in the event of a detected crash, activates at least one external safety component 12a, 12b and/or at least one internal safety component 12c, 12d using a triggering concept. In the exemplary embodiment shown, safety system 10 has four evaluation and control units 14a, 14b, 14c, 14d, each evaluation and control unit 14a, 14b, 14c, 14d being assigned to one safety component 12a, 12b, 12c, 12d. Further evaluation and control units, not shown, may also be provided. Thus, each individual sensor unit 20 may also have its own evaluation and control unit for processing and/or editing the acquired sensor variables, as well as for the output of sensor signals S. The communication between individual evaluation and control units 14a, 14b, 14c, 14d and system components may take place wirelessly and/or in wire-bound fashion via a BUS system, preferably via a CAN bus. Direct links for the exchange of information between individual evaluation and control units 14a, 14b, 14c, 14d and system components, respectively, are likewise conceivable. For example, the at least one sensor unit 20 includes pressure-sensitive sensors that ascertain an impact area on motor bike 1 and/or sensors which ascertain objects and/or obstacles and/or other crash-relevant vehicle-environment data and make it available for evaluation. For instance, such sensors may be based on video and/or radar and/or lidar and/or PMD and/or ultrasound technologies. The use of data and information of an ABS sensor system or an RPM sensor system is also possible.

As further evident from FIG. 1, motor bike 1 shown takes the form of a motorcycle, but other motor bikes for which a rider 30 should have additional protection, such as a motor trike and/or a quad, are also conceivable.

According to the present invention, a first evaluation and control unit 40 receives presence signals Sa, Sb, Sc, Sd from the at least one external safety component 12a, 12b and/or the at least one internal safety component 12c, 12d and evaluates the signals received in order to detect safety components 12a, 12b, 12c, 12d currently available, first evaluation and control unit 40 selecting the triggering concept as a function of detected safety components 12a, 12b, 12c, 12d currently available. In the exemplary embodiment shown, first evaluation and control unit 40 receives signals Sa, Sb, Sc, Sd from the at least one external safety component 12a, 12b and/or the at least one internal safety component 12c, 12d via a second interface 40.2. In this way, the at least one external safety component 12a, 12b and/or the at least one internal safety component 12c, 12d is/are no longer considered separately and optimized independently of each other, but rather are integrated into one common safety system of the present invention.

With the aid of sensor units 20 already present in motor bike 1, first evaluation and control unit 40 monitors the driving condition and detects a critical driving condition and/or an imminent and/or occurring collision. Thus, existing sensor units 20 may be used by several safety components 12a, 12b, 12c, 12d. By skilled placement of sensor units 20 and the availability of extensive information from various sensor units 20 for assessing the driving condition, the overall performance of safety system 10 according to the present invention is improved.

As apparent from FIGS. 1 and 2, rider 30 is wearing protective clothing, which has two external safety components 12a, 12b. In this case, a first external safety component 12a takes the form of what is termed an airbag jacket, and a second external safety component 12b is an airbag helmet. Airbag jacket 12a includes a jacket, into which a first external airbag 12.2a, a second evaluation and control unit 14a and a transmitter 12.1a are integrated. Airbag helmet 12b includes a neck guard, which is implemented as second external airbag 12.1b, and a third evaluation and control unit 14b. Alternatively or additionally, a safety component detachably mounted on motor bike 1 may be carried along. In this manner, rider 30 himself is able to expand and/or configure safety system 10 of the present invention, and rider 30 himself may decide about the extent of protection.

As also evident from FIGS. 1 and 2, in the exemplary embodiment shown, motor bike 1 has two internal safety components 12c, 12d, which are realized as safety-belt system 12c and as an airbag system 12d integrated into motor bike 1. Safety-belt system 12c includes a fourth evaluation and control unit 14c and a belt strap 12.1c that is coupled to a belt buckle 12.2c and ties rider 30 to motor bike 1. Airbag system 12d includes a fifth evaluation and control unit 14d, a first internal airbag 12.1d implemented as front tank airbag and a second internal airbag 12.2d realized as rear tank airbag, each of which is disposed on fuel tank. In this case, airbag system 12d functions as a supporting device for rider 30, reducing a further forward displacement in the event of a collision. In the exemplary embodiment shown, fifth evaluation and control unit 14d, assigned to airbag system 12d, takes on the functionality of first evaluation and control unit 40. All further evaluation and control units 14a, 14b, 14c are subordinate to first evaluation and control unit 14d. Evaluation and control unit 14d, 40, assigned to airbag system 12d, selects the triggering concept as a function of the mode of operation of safety components 12a, 12b, 12c, 12d currently available and as a function of the crash situation detected. Thus, for example, an airbag system 12d, in combination with a safety-belt system 12c, is triggered later or more gently in order to reduce the strain for rider 30. As a consequence, in this example, in the case of a frontal crash, the triggering characteristic of integrated airbag system 12d is optimized for the interaction with safety-belt system 12c, and first external airbag 12.2a of airbag jacket 12a and second external airbag 12.1b of airbag helmet 12b are activated at the optimal instant by first evaluation and control unit 14d, 40. This has the advantage that especially external safety components 12a, 12b which are not permanently installed in motor bike 1, but rather are integrated into the protective clothing of rider 30 or are detachably joined to motor bike 1, may be incorporated flexibly into safety system 10, and thus contribute to the improvement in safety. Furthermore, in addition to the passive internal safety components indicated, further safety components may be integrated into motor bike 1, such as an antilock braking system.

The triggering concept selected by first evaluation and control unit 40 specifies an activation sequence and/or an activation instant for safety components 12a, 12b, 12c, 12d currently available. For example, triggering signals ASa, ASb, ASc, ASd are output in a specific order via a third interface 40.3 to safety components 12a, 12b, 12c, 12d currently available. The triggering concept is stored preferably as at least one characteristic curve in a memory unit 42. Alternatively, first evaluation and control unit 14d, 40 may generate the triggering concept based on sensor signals S received and evaluated, and based on presence signals Sa, Sb, Sc, Sd of safety components 12a, 12b, 12c, 12d currently available. In the exemplary embodiment shown, first evaluation and control unit 14d, 40 includes three separate interfaces 40.1, 40.2, 40.3. Naturally, the functionalities of the three interfaces 40.1, 40.2, 40.3 described may be combined in one common interface. The at least one interface 40.1, 40.2, 40.3 of first evaluation and control unit 14d, 40 permits a wireless and/or wire-bound communication with safety components 12a, 12b, 12c, 12d currently available. In the exemplary embodiment shown, the at least one interface 40.1, 40.2, 40.3 is implemented as a standardized interface, so that safety components 12a, 12b, 12c, 12d and/or evaluation and control units 14a, 14b, 14c, 14d and/or sensor units 20 are able to be combined regardless of the manufacturer.

The corresponding method of the present invention for triggering a safety system 10 for a motor bike 1 preferably detects safety components 12a, 12b, 12c, 12d currently available within the context of a system start, in which presence signals Sa, Sb, Sc, Sd are received from at least one external safety component 12a, 12b and/or at least one internal safety component 12c, 12d and evaluated in order to detect safety components 12a, 12b, 12c, 12d currently available. A triggering concept is selected as a function of detected safety components 12a, 12b, 12c, 12d currently available. In response to a detected crash, safety components 12a, 12b, 12c, 12d currently available are then activated using the triggering concept selected.

The safety system according to the present invention described, and the corresponding method of the present invention for triggering a safety system for a motor bike permit a modular adaptive system of the passive safety for motorized two-wheelers and/or motor trikes and/or quads, the system including both safety components which are integrated into the motor bike such as sensors and/or airbags, as well as safety components that are integrated into the clothing of the rider. Depending on the availability of the individual safety components, the passive safety concept of the overall system of rider and vehicle is adapted to the instantaneous conditions and the protective effect for the rider is optimized.

What is claimed is:
1. A safety system for a motor bike, comprising:
an arithmetic control unit;
at least one sensor; and
an interface;
wherein:
the arithmetic control unit is configured to:
(i) receive, from a plurality of safety components and via the interface, presence signals;
(ii) evaluate the presence signals in order to detect which of the plurality of safety components are currently available;
(iii) receive, from the at least one sensor and via the interface, crash-relevant information;
(iv) by evaluating the crash-relevant information, detect a crash, a plurality of triggering control patterns being usable in response to the crash;

(v) based on the detection of which of the plurality of safety components are currently available, select one of the plurality of triggering control patterns to respond to the detected crash; and (vi) based on the selected triggering control pattern, trigger, via the interface, one or more of the plurality of safety components that were detected to be currently available; and for each of at least one of the one or more of the plurality of safety components that is triggered, the respective safety component is triggerable to operate in different ways depending on which of the plurality of triggering control patterns that are usable to respond to the detected crash is selected, so that the safety system is configured for the respective safety component to be operated differently in response to the detected crash depending on which other ones of the plurality of safety components are detected to be currently available.

2. The safety system as recited in claim 1, wherein the an arithmetic control unit is configured to select the triggering control pattern as a function of a mode of operation of the safety components currently available.

3. The safety system as recited in claim 1, wherein the an arithmetic control unit is configured to select the triggering control pattern as a function of a characteristic of the detected crash.

4. The safety system as recited in claim 1, wherein the triggering control pattern specifies at least one of an activation sequence and an activation instant for the one or more safety components.

5. The safety system as recited in claim 4, wherein the triggering control pattern is selected using at least one characteristic curve stored in a memory unit.

6. The safety system as recited in claim 4, wherein the plurality of safety components includes an external safety component which is at least one of (i) detachably mounted on the motor bike, (ii) integrated into a clothing of a rider of the motor bike, and (iii) integrated into a helmet of the rider.

7. The safety system as recited in claim 4, wherein the plurality of safety components includes at least one of a safety-belt system and an airbag system integrated into the motor bike.

8. The safety system as recited in claim 1, wherein the an arithmetic control unit is configured to deploy the respective safety component, to respond to the detected crash, according to a control method that defines different forces at which the respective safety component is to deploy depending on which of the other ones of the plurality of safety components are detected to be currently available.

9. The safety system as recited in claim 1, wherein the an arithmetic control unit is configured to deploy the respective safety component, to respond to the detected crash, according to a control method that defines different times for deployment of the respective safety component relative to a time of the crash depending on which of the other ones of the plurality of safety components are detected to be currently available.

10. A method for triggering a safety system for a motor bike, comprising:

receiving presence signals from a plurality of safety components;

evaluating the presence signals in order to detect which of the plurality of safety components are currently available;

receiving crash-relevant information from at least one sensor unit;

by evaluating the crash-relevant information, detecting a crash, a plurality of triggering control patterns being usable in response to the crash;

based on the detection of which of the plurality of safety components are currently available, selecting one of the plurality of triggering control patterns to respond to the detected crash; and based on the selected triggering control pattern, triggering one or more of the plurality of safety components that were detected to be currently available;

wherein, for each of at least one of the one or more of the plurality of safety components that is triggered, the respective safety component is triggerable to operate in different ways depending on which of the plurality of triggering control patterns that are usable to respond to the detected crash is selected, so that the safety system is configured for the respective safety component to be operated differently in response to the detected crash depending on which other ones of the plurality of safety components are detected to be currently available.

11. The method as recited in claim 10, wherein the triggering control pattern specifies at least one of an activation sequence and an activation instant for the one or more one safety components.

* * * * *